(12) United States Patent
Gill

(10) Patent No.: US 9,946,929 B2
(45) Date of Patent: Apr. 17, 2018

(54) METHOD OF DETECTING BOUNDARIES OF THE HUMAN EYE

(71) Applicant: Boris Gill, Playa Del Rey, CA (US)

(72) Inventor: Boris Gill, Playa Del Rey, CA (US)

( * ) Notice: Subject to any disclaimer, the term of this patent is extended or adjusted under 35 U.S.C. 154(b) by 105 days.

(21) Appl. No.: 15/204,497

(22) Filed: Jul. 7, 2016

(65) Prior Publication Data

US 2017/0011250 A1 Jan. 12, 2017

Related U.S. Application Data

(60) Provisional application No. 62/190,090, filed on Jul. 8, 2015.

(51) Int. Cl.
  *G06K 9/00* (2006.01)
(52) U.S. Cl.
  CPC ....... *G06K 9/0061* (2013.01); *G06K 9/00604* (2013.01); *G06K 9/00617* (2013.01)
(58) Field of Classification Search
  CPC ............. G06K 9/00604; G06K 9/0061; G06K 9/00617
  USPC .................................................. 382/117, 199
  See application file for complete search history.

(56) References Cited

U.S. PATENT DOCUMENTS

| | | | | |
|---|---|---|---|---|
| 6,614,919 B1 * | 9/2003 | Suzaki | ................. | A61B 5/1171 351/200 |
| 7,418,115 B2 * | 8/2008 | Northcott | ............. | A61B 3/1216 351/220 |
| 7,970,179 B2 * | 6/2011 | Tosa | ................... | G06K 9/00597 351/206 |
| 8,755,607 B2 * | 6/2014 | Bergen | ............... | G06K 9/00597 382/117 |

* cited by examiner

*Primary Examiner* — Daniel Mariam
(74) *Attorney, Agent, or Firm* — James A. Italia; Italia IP

(57) ABSTRACT

A method of generating a reliable image of an iris for subsequent optical analysis leading to identification or authentication of a mammal. The method comprises directing point light sources towards the iris, capturing a gray scale image of the iris and reflections of the point light sources, deriving a two tone image from the gray scale image, generating an image containing the true boundaries of the pupil, determining boundaries of the iris and generating an image containing the true boundaries of the iris, and generating a final image of the iris from the image containing the true boundaries of the iris. This establishes a reliable image of the iris. The process may further comprise conducting an identification or authentication process based on optical analysis of the final image of the iris and comparison with a pre-established data corresponding to a person whose identity has been confirmed.

20 Claims, 9 Drawing Sheets

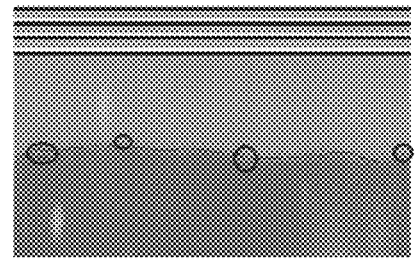
FIG. 16
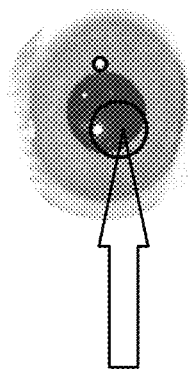
FIG. 14
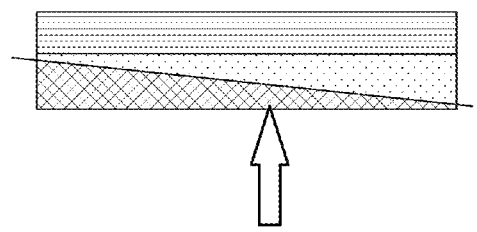
FIG. 15
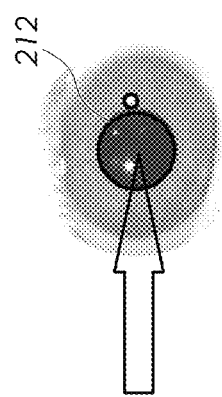
FIG. 12
FIG. 13

METHOD OF DETECTING BOUNDARIES OF THE HUMAN EYE

CROSS-REFERENCE TO RELATED APPLICATION

This application claims priority to U.S. Provisional Patent Application No. 62/190,090, filed Jul. 8, 2015, the content of which is hereby incorporated by reference in its entirety.

FIELD OF THE DISCLOSURE

The present disclosure relates to biometrics, and more particularly, to detecting and analyzing a target image being used, e.g., for personal identification or authentication.

BACKGROUND

Biometrics provide ways of identifying individual people, based on uniqueness of certain body components, such as the iris of the eye. However, successful identification or other exploitation of biometrics requires accurate data capture and analysis of the target image.

Current iris based identification systems suffer from inability to determine whether imagery has captured the iris sufficiently to perform identification successfully, as well as assuring that the target image is that of a responsive subject (e.g., alive, fully conscious, etc.). Current systems may utilize faulty images, which may result in false negatives when identifying the subject. Alternatively, the system may generate false positives if developing images of unresponsive eyes.

SUMMARY

The disclosed concepts provide ways to correctly and accurately capture and exploit images, e.g., for biometric identification and authentication, of the human eye in arriving at accurate identification of individuals. More particularly, the novel method determines whether the eye is sufficiently open, focused in an appropriate direction, and has sufficient lighting to enable identification to be successfully performed. The novel system identifies whether eye imagery is sufficiently complete to perform identification analysis. Also, the novel system can screen out artificially reproduced eyes, photographs and other images which may be introduce to defeat an identification process, and people in debilitated conditions (e.g., comatose, drowsy, under the influence of drugs, suffering from a debilitating condition such as neurological trauma, or even dead).

To these ends, there is disclosed a method of generating a reliable image of an iris for subsequent optical analysis leading to identification or authentication of a mammal. The method comprises directing point light sources towards the iris, capturing a raw image of the eye, developing a gray scale image of the iris and reflections of the point light sources, deriving a two tone image from the gray scale image, generating an image containing the true boundaries of the pupil, determining boundaries of the iris and generating an image containing the true boundaries of the iris, and generating a final image of the iris from the image containing the true boundaries of the iris. This establishes a reliable image of the iris. The process may further comprise conducting an identification or authentication process based on optical analysis of the final image of the iris and comparison with a pre-established data corresponding to a person whose identity has been confirmed.

Nature of the novel method will become readily apparent upon further review of the following specification and drawings.

BRIEF DESCRIPTION OF THE DRAWINGS

Various objects, features, and attendant advantages of the disclosed concepts will become more fully appreciated as the same becomes better understood when considered in conjunction with the accompanying drawings, in which like reference characters designate the same or similar parts throughout the several views, and wherein:

FIG. 12 is an image of the eye of the person, showing an additional stage of processing, in accordance with the method of FIG. 1;

FIG. 13 is a detail view of the image of FIG. 12;

FIG. 14 is an image of the eye of the person, showing yet a further stage of processing, in accordance with the method of FIG. 1;

FIG. 15 is a detail view of the image of FIG. 14;

FIG. 16 is a detail view of FIG. 15, taken at scale greater than that of FIG. 15;

DETAILED DESCRIPTION

Iris or full eye based identification provides the basis of a unique personal biometric signature for individual people. A method of generating the biometric signature enables real time identification based on scanning the eyes. The method can detect situations which would defeat successful identifications prior to attempting full iris image processing. Such situations may include, for example, eyes insufficiently widely open, previously obtained biometric signature not registered with a system database, poor image capture, identification failure for reasons not immediately identifiable, and possibly others.

The method may be practiced with user-performed scanning applications such as access control or access to restricted data. In addition to observing static biometric characteristics, such as iris patterns, the method can monitor physiological behaviors such as variations in facial expression, movement of pupils and eyelids, and the like, to assure that the person being scanned and observed for identifications purposes is the actual person characteristics from whom have been archived in a database for subsequent verification. This maintains integrity for example of point of sale transactions, use of credit cards and similar instruments, financial transaction confirmations, and appropriate use of controlled or access restricted materials.

Collection of biometric data and extraction of critical data from the eye and its dynamic behavior is enabled for monitoring and analytic applications apart from identification per se. For example, sleepiness or other incapacitation of vehicle drivers, monitoring of drug and alcohol use or impairment, and biomedical monitoring of autonomic nervous system, brain-vascular and psychosomatic conditions are among applications of the novel method.

Figure 1:
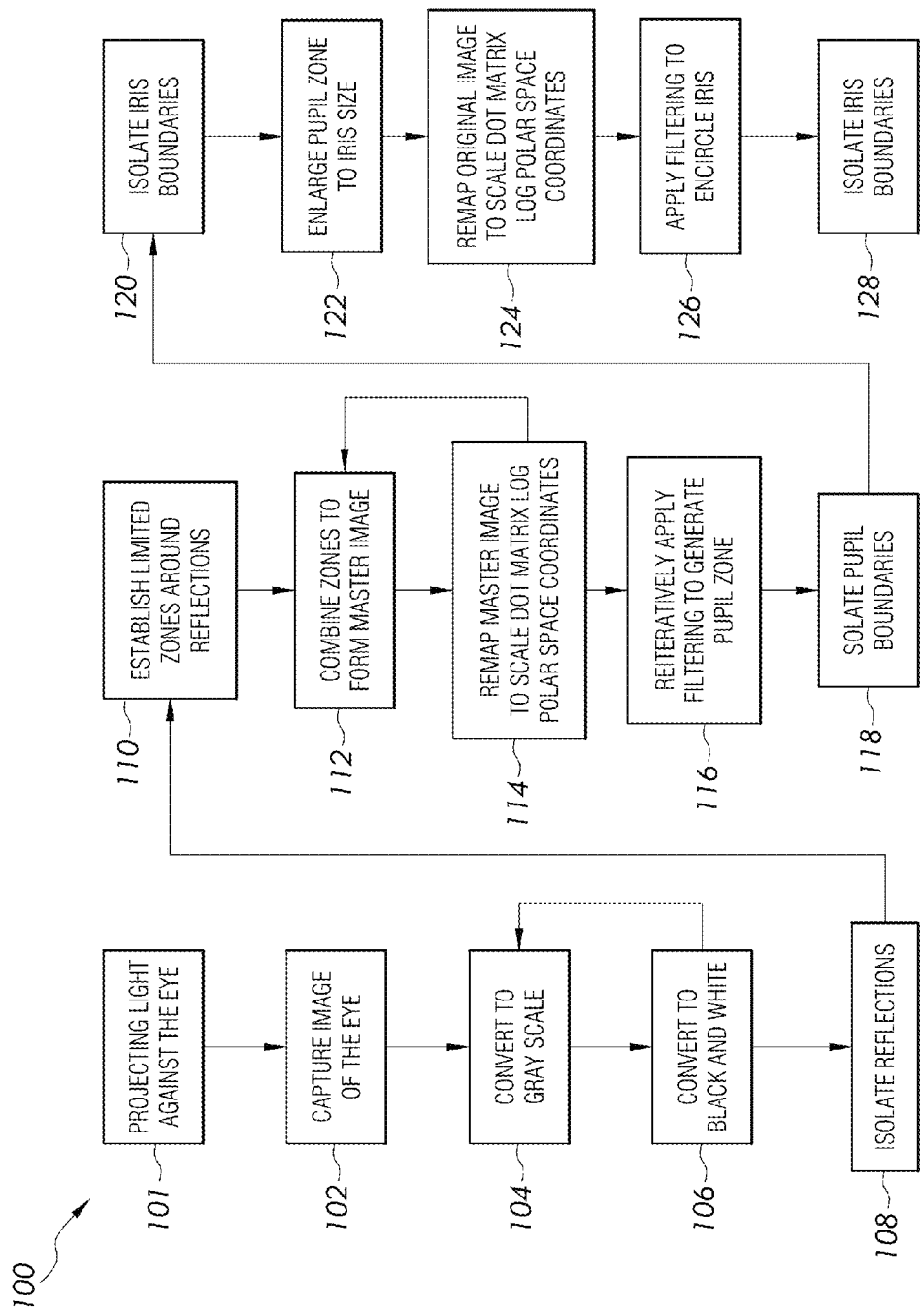
FIG. 1 is a flow chart of steps of a method of generating a reliable image of an iris for subsequent optical analysis leading to identification or authentication of a mammal, according to at least one aspect of the disclosure.
Figure 2:
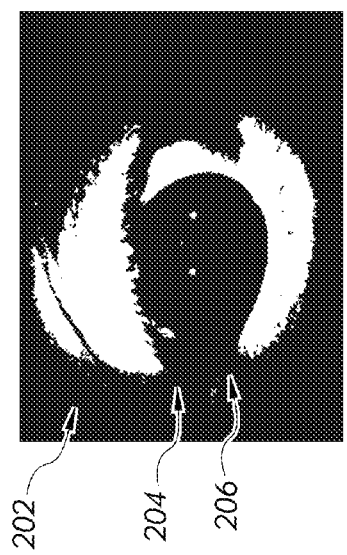
FIG. 2 is an exemplary initial image of the eye of a person, the initial image to be processed in accordance with the method of FIG. 1.

Referring now to FIG. 1, according to at least one aspect of the disclosure, there is shown a summary of a method 100 of generating a reliable image of an iris for subsequent optical analysis leading to identification or authentication of a mammal. Light from point light sources is projected against the eye 202 (summarized as step 101 in FIG. 1) to generate reflections 204 (FIG. 2). A point light source is a source such as a light emitting diode (LED) of dimensions and configuration which will result in a reflection 204 of surface area of at least two percent of the surface area of the iris 206, and up to seventy-five percent of the surface area of the iris 206. It is currently preferred to limit this range to two to ten percent of the surface area of the iris 206. Depending upon the distance to the eye 202, an LED may be for example 2.2 millimeters in diameter with diffuser lenses of ninety degrees. The resultant reflection 204 may be approximately 1 millimeter or less in diameter.

Next, an image of the eye 202 is captured (step 102 in FIG. 1). If eye images are acquired in red-green-blue color mode, they are converted to an eight bit gray scale (step 106) using the formula:

Intensity=0.21red+0.72blue+0.07blue.

In binaries of eight bit gray scale, 0 is a minimum value corresponding to solid black and 255 a maximum value corresponding to solid white.

Figure 3:
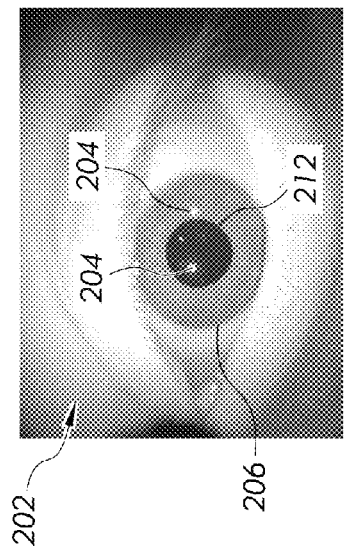
FIG. 3 is a two-tone rendition of the image of FIG. 2.

Then, the gray scale image is converted to a black and white image (FIG. 3 and step 108 in FIG. 1) using binary truncation. A threshold setting is based on dot brightness intensity (within the range of 0 to 255), where pixels exceeding specified the threshold value are rendered as white, with remaining pixels rendered as black. As indicated in FIG. 1, a number of iterations of steps 106 and 108, such as two iterations, may be required. The applicant regards a gray scale level threshold of 200 as suitable for the first iteration, and a gray scale level threshold of 215 as suitable for the second iteration, as these values are regarded as optimal to suit all skin, iris, and sclera colors.

It would be possible to break the gray scale into an additional number of steps or levels.

Figure 4:
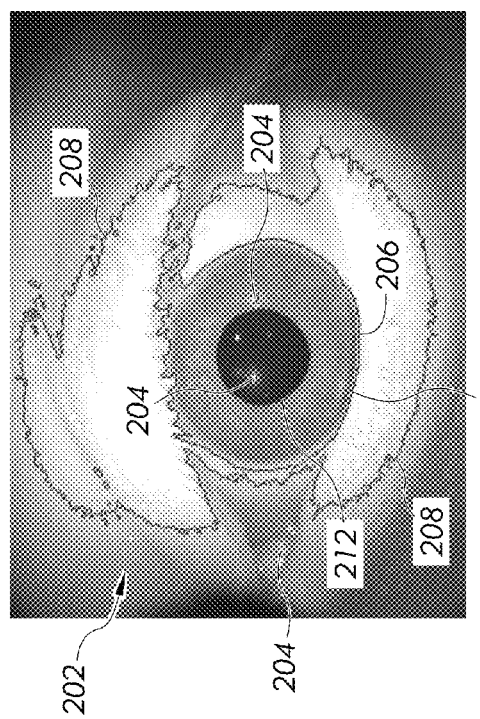
FIG. 4 is an image of the eye of the person, showing a further stage of processing, in accordance with the method of FIG. 1.

Reflections 204 are then isolated, or located within a limited contour area. This is seen in FIG. 1 as step 108. Referring also to FIG. 4, 208 represents a boundary line of eye 202, and 210 represent a boundary line of iris 206. Step 106 is performed twice, once at a gray scale level threshold of 200, and once at a threshold of 215. The limited contour area is isolated or identified on the eye image, using two levels of intensity ranges (i.e., black and white).

Figure 5:
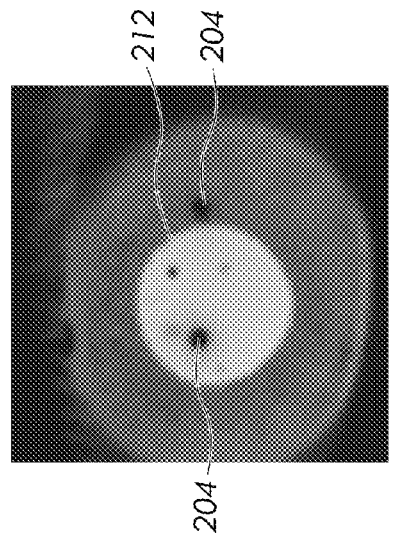
FIG. 5 is an image of the eye of the person, showing a still further stage of processing, in accordance with the method of FIG. 1.

Reflections 204 (three reflections 204 are identified in the example of FIG. 4) of point light sources (e.g., LED point source lights directed toward the subject eye) are located. Located paired reflections 204 are compared to one another for size, for each gray scale threshold being used. Any reflection that changes in width or height by fifty percent or more is discarded. All remaining candidates are then matched to identify paired reflections 204. In this example, two LED point source lights have been used. It will be seen in FIG. 5 that two reflections 204 are called out.

False results arising from spurious reflections, such as cross reflections from the actual reflections 202, wet matter (not shown) in the eyes, point light source lenses (not shown), light from foreign sources, etc., may be screened out by calculating height and width of each reflection candidate, and determining an effective center of each reflection candidate. The gray scale level threshold analysis will yield the best match.

It is important to note that method 100 is independent of the number of point light sources.

Also, point light sources could rely on mirrors rather than light emitting elements per se.

Figure 6:
FIG. 6 is an image of the eye of the person, showing another stage of processing, in accordance with the method of FIG. 1.

Once a pair of true reflection points are identified, and a surrounding limited zone of the image surrounding the reflections (summarized as step 110 in FIG. 1) is defined, that part of the image surrounding the pupil 212 is extracted. FIG. 6 represents a limited zone containing iris 206, of the original image seen in FIG. 2.

Pupil 212 will be contained within a zone. An arbitrary rectangular zone can be designated. A diagonal spans opposed corners of the rectangular zone. The length of the diagonal is not less than N times the size of the pupil diameter, where N equals the number of reflection light sources plus two, divided by the number of reflection light sources. Each scanned image has resolution expressed as points per inch (or alternatively stated, pixels per inch).

Generally, an area enclosing the pupil must be determined. A value D of pupil diameter may be calculated as horizontal resolution (pixels per inch) plus vertical resolution (pixels per inch), divided by four.

$D =$ (horizontal resolution+vertical resolution)/4

$N =$ (number of lights, rounded to nearest whole=2)/ number of lights

This identifies an area, such as a rectangle, that contains the entire pupil. The resulting value is always greater than the pupil diameter, thereby assuring that the iris is contained within a defined area. This is expressed mathematically as D>N×pupil size.

Similarly, areas surrounding light reflections are defined, these areas always being greater than the pupil. Finally, a single area enclosing the previously mentioned areas is defined, and becomes a candidate area containing the pupil.

Figure 7:
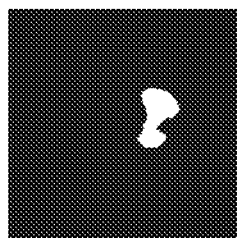
FIG. 7 is an image of the eye of the person, showing a still further stage of processing, in accordance with the method of FIG. 1.
Figure 8:
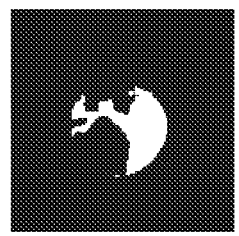
FIG. 8 is an image of the eye of the person, showing yet a further stage of processing, in accordance with the method of FIG. 1.
Figure 9:
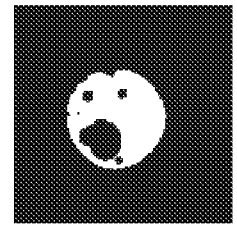
FIG. 9 is an image of the eye of the person, showing a still further stage of processing, in accordance with the method of FIG. 1.

The finalized area (e.g., as seen in FIG. 7) which surrounds the pupil 212 is generally composed of those areas (e.g., squares) which surround light reflections. It is desirable that the finalized area be minimized in magnitude, to reduce the total data burden for data processing purposes. The finalized area may be progressively decreased by experimentation.

For optimal efficacy of calculations, an average value of pupil diameter in dots D is initially determined by experimentation with the scanning device. Physical pupil accommodation occurs in a range of 2 mm to 5 mm, and is partially dependent on eye illumination intensity. The resulting scale metric-to-dots is related to on camera resolution, scanning distance and lens magnification. Utilizing a number of images and manually calculating the number of dots in the diameter of pupil 212, then taking an average, may result in an estimate of how many dots occur in a diameter of the pupil 212, for any given scanning device.

In most cases the scanning device displays its resolution and lens magnification. Where this occurs, this data may be gleaned from the scanning device to save time.

A corresponding image portion may be extracted using coordinates of a rectangular zone around the pupil 212. The image is subjected to inversion of white and black portions, which may be performed mathematically by subtracting the original intensity value from 255. The pupil contour may be based on the outermost cluster of pixels, and approximating how close the pupil contour is to a circle. Truncation may be performed as previously described.

Black-to-white truncation using different threshold values is applied to the gray scale image. Experimentation has revealed that a useful arbitrary range of truncation threshold lies within a range of 232 to 244. Approximations with threshold values less than 232 will increase the diameter of the desired circle of the pupil 212 because of spurious clusters of extraneous light. Values of the threshold over 244 results in a decreasing cluster of pupil dots that when truncated, will yield a circle smaller than the pupil 212. In the present example, using 236 as a threshold will yield the optimum match.

Figure 10:
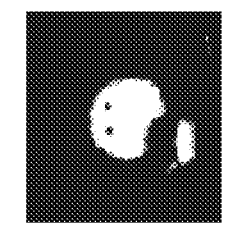
FIG. 10 is an image of the eye of the person, showing a further stage of processing, in accordance with the method of FIG. 1.
Figure 11:
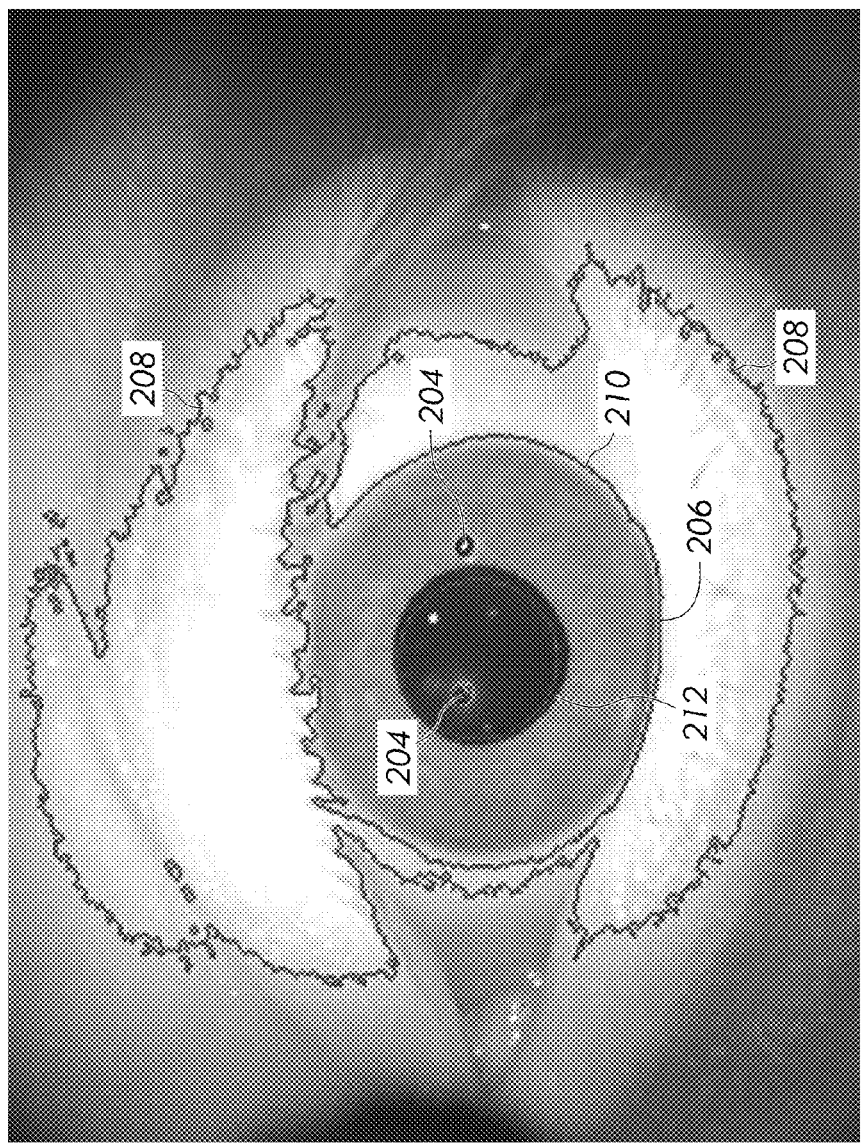
FIG. 11 is an image of the eye of the person, showing another stage of processing, in accordance with the method of FIG. 1.

FIGS. 7-10 show approximations based on thresholds of 232 (FIG. 7), 236 (FIG. 8), 240 (FIG. 9), and 244 (FIG. 10). FIG. 11 represents a successfully identified pupil 212.

That approximation of the circle of the pupil 212 in the image zone having reflections may be considered as a starting point for finding the true contour of the pupil 212. It is important to note that finding a candidate for the pupil 212 is not possible if the rectangular zone does not contain the pupil 212. The size of this rectangular zone may be progressively increased to fifty percent of original image size. Arbitrary steps of ten percent increase for example will result in a balance between computational efficiency and precision of pupil detection.

After limited zones around reflections 204 have been generated, zones are combined to form a master image (summarized as step 112 in FIG. 1). The next step is to find true boundaries of the pupil 212, based on approximation from the prior step.

The master image is remapped to scale dot matrix polar space coordinates (summarized as step 114 in FIG. 1). This process may require several iterations (summarized as step 116 in FIG. 1). The original image is re-mapped to scale dot-matrix log-polar space coordinates. A reference source for information on a re-mapping algorithm is http:"//docs.opencv.org//modules/imgproc/doc/geometric_transformations.html.

In the even that the center of the detected pupil contour has shifted, the calculation line based on intensity gradient points (with at least three points, i.e., beginning, center, and end) will satisfy an equation $X=kY+b$ in log polar space coordinates. Calculated coefficients k and b are used for retroactive recalculations for an original Cartesian coordinates system, to move the center to a more appropriate position within the image. The procedure is repeated until a coefficient k approaches zero.

FIG. 13 illustrates a successfully identified pupil.

With reference to FIG. 12 and additionally to FIGS. 13-16, detection of boundaries is accomplished by filtering out all short lines and all lines deviating from the vertical by more than sixty degrees. Short lines are those less than ten percent of the average size from the sum of the lengths of all lines divided by the number of lines representing a gradient border. All remaining lines are than connected into a single line. Whether two lines should be connected is decided by initially connecting them, converting the image back into Cartesian coordinates, and seeing how well the connected line approximates an ellipse. Connected lines with minimal deviation from an ideal ellipse will be considered the final contour of the pupil 212. This may be performed by standard methods of pattern recognition in image analysis. This step is performed for the entire approximated pupil 212. The final result is a new contour that best approximates the true boundaries of the pupil 212 (summarized as step 118 in FIG. 1). In this contour, gaps which were generated by filtering have been rectified and closed.

Figure 18:
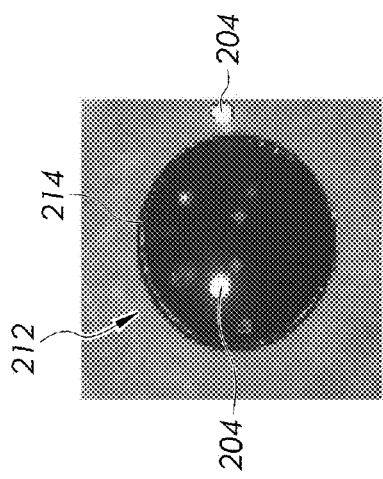
FIG. 18 is an image of the eye of the person, showing a still further stage of processing, in accordance with the method of FIG. 1.
Figure 17:
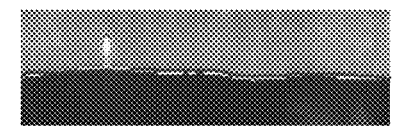
FIG. 17 is a further detail view of FIG. 15.
Figure 21:
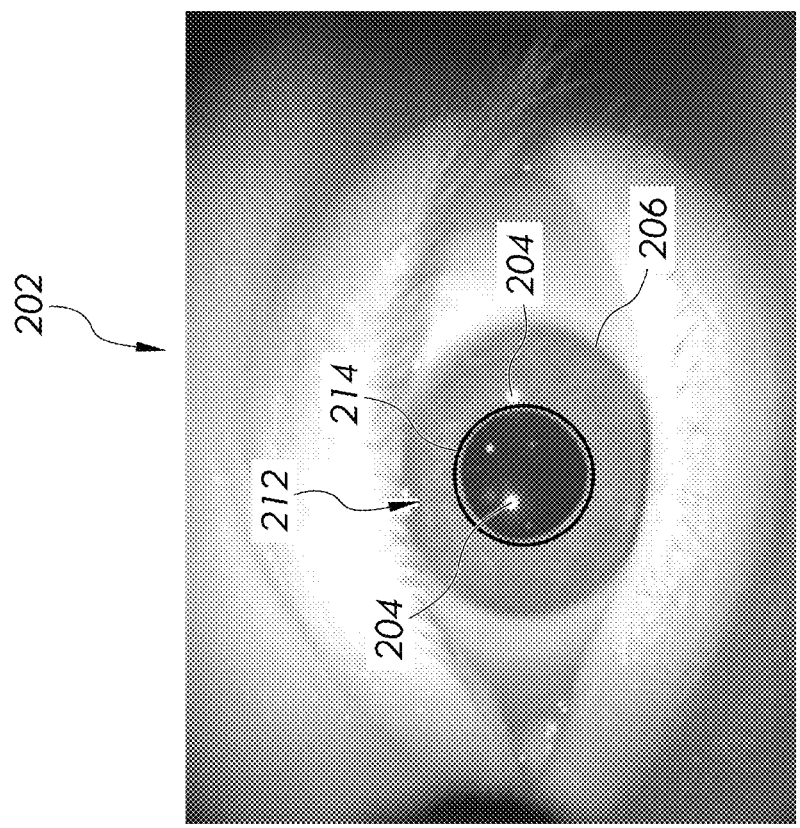
FIG. 21 is a further detail view of FIG. 19, also at scale greater than that of FIG. 19.
Figure 20:
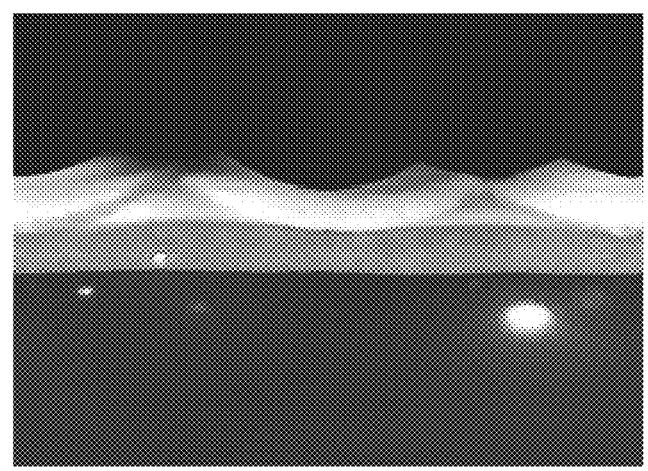
FIG. 20 is a detail view of FIG. 19, taken at scale greater than that of FIG. 19.

With the boundaries of the pupil determined, the next step is to determine the boundary line 210 of the iris 206. This is summarized as step 120 in FIG. 1. The same process for determining the boundary (FIGS. 17 and 18) of the pupil is repeated. A rectangular or square portion of the image six times as large as the pupil diameter is arbitrarily drawn around the pupil center (summarized as step 122 in FIG. 1, enlarging the pupil zone to the size of the iris 206), the pupil center having been previously determined. The average iris size is 12 mm, which is about three times bigger than the pupil, is approximated by the general ratio of pupil to iris, and is confirmed by field measurements (e.g., by scanning and manually measuring).

Figure 23:
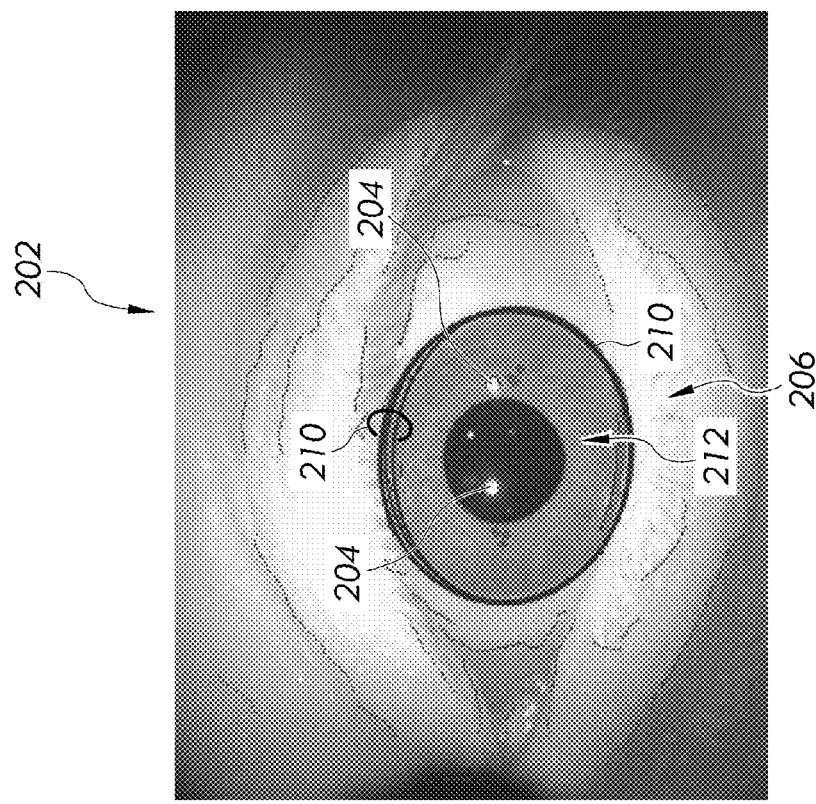
FIG. 23 is an image of the eye of the person, showing a still further stage of processing, in accordance with the method of FIG. 1.
Figure 22:
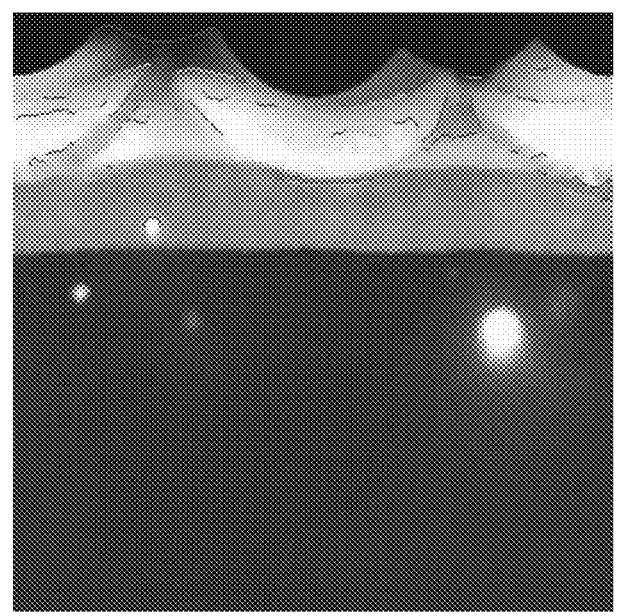
FIG. 22 is still another detail view of FIG. 19, taken at still greater scale than FIG. 22.
Figure 24:
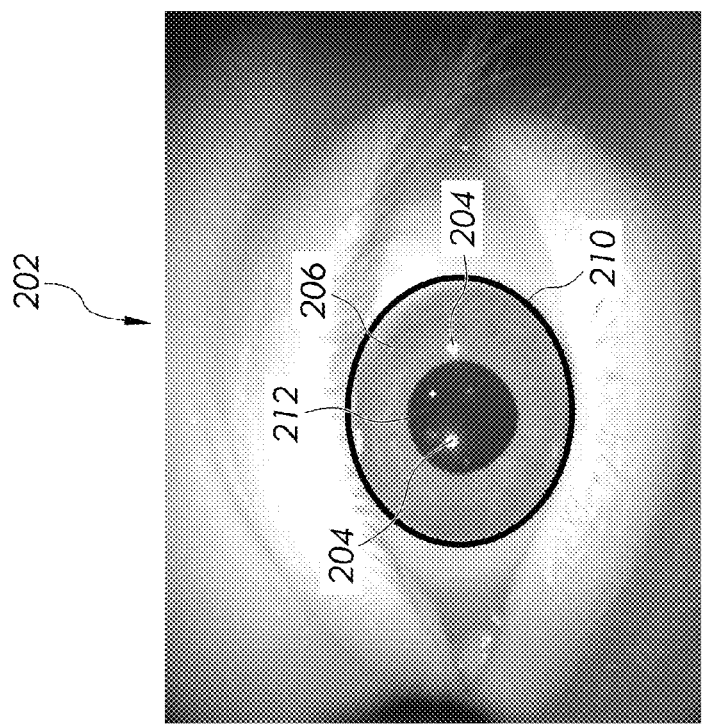
FIG. 24 is an image of the eye of the person, showing an additional stage of processing, in accordance with the method of FIG. 1.

With additional reference to FIGS. 22-24, the original image is remapped to scale dot-matrix log-polar coordinates (step 124 in FIG. 1). Filtering is applied to encircle the iris 206 (step 126 in FIG. 1) and to filter out short lines and lines deviating from the vertical. The iris boundary 210 is then isolated (step 128 in FIG. 1).

Figure 19:
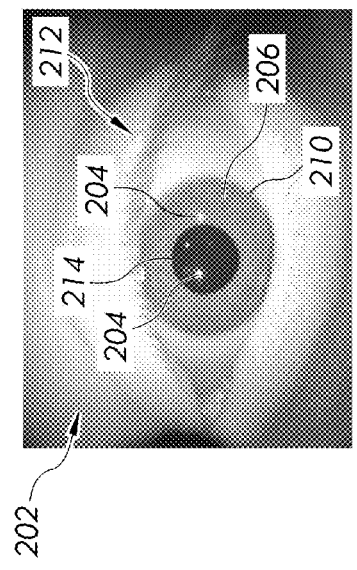
FIG. 19 is an image of the eye of the person, showing still another stage of processing, in accordance with the method of FIG. 1.

A contour is thus generated that best approximates the boundary 210 of the iris 206, thereby enabling conventional image analysis based on an input image which is sufficiently accurate to enable identification, but with minimized processing required. FIG. 19 represents the eye 202, with iris boundary 214 identified.

This leads to several applications of conventional image analysis. One is that of identification (i.e., detecting a person's identity based on comparing unchangeable natural characteristics such as facial images, voice, fingerprints, iris, DNA, etc.). Another application is that of authentication (i.e., confirming identity of a biometric associated with a non-biometric, such as a user identification number or password). In addition, a personal biometric signature. This enables real time analysis of behavior during eye scanning Failures of screening and automated identification or authentication may be detected, with subsequent effort to verify or authenticate identification being terminated if a condition preventing successful identification or authentication is found. Examples of such conditions include insufficiently opened eyes, a personal biometric signature not previously registered with the identification or authentication system, a poor quality initial image was acquired, or an unidentifiable error has occurred.

Self-scanning for real time interactive scanning navigation control may be performed. Examples of applications for self-scanning include controlled entry, access to private or sensitive data, and others.

In addition, eye related physiological behavior (e.g., facial, pupil, and eyelid movements) may be monitored to prevent spurious attempts to circumvent security procedures.

A further example is collection and extraction of eye based imagery to promote miscellaneous applications, such as detecting impairment due to drowsiness, drug and alcohol use, biomedical monitoring of the autonomous nervous system, brain, vascular and psychosomatic conditions. Detecting impairment may be used to promote safe or effective use of automobiles and like vehicles, machinery, etc.

Figure 25:
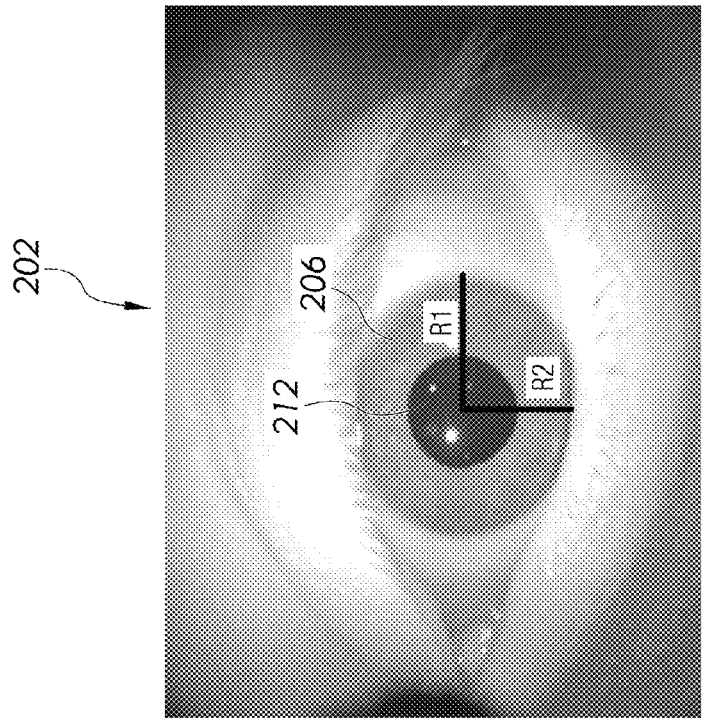
FIG. 25 is a final image of the eye of the person, in accordance with the method of FIG. 1.

One characteristic which may be used in such monitoring is that of to what degree the eye 202 is open. This is determined by comparing radius R1 to radius R2 (FIG. 25). R1 is a horizontal line from the center of the pupil 212 to the right edge of the iris 206 in FIG. 25. R2 is a vertical line from the center of the pupil 212 to the bottom limit of the iris 206.

While the disclosed concepts have been described in connection with what is considered the most practical and preferred implementation, it is to be understood that the disclosed concepts are not to be limited to the disclosed arrangements, but are intended to cover various arrangements which are included within the spirit and scope of the broadest possible interpretation of the appended claims so as to encompass all modifications and equivalent arrangements which are possible.

It should be understood that the various examples of the apparatus(es) disclosed herein may include any of the components, features, and functionalities of any of the other examples of the apparatus(es) disclosed herein in any feasible combination, and all of such possibilities are intended to be within the spirit and scope of the present disclosure. Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples presented and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims.

I claim:

1. A method of generating a reliable image of an iris for subsequent optical analysis leading to identification or authentication of a mammal, comprising:
    directing point light sources towards the iris;
    capturing a gray scale image of the iris and reflections of the point light sources;
    deriving a two tone image from the gray scale image;
    extracting from the two tone image that part of the image which immediately surrounds the pupil;
    determining true boundaries of the pupil from that part of the image which immediately surrounds the pupil and generating an image containing the true boundaries of the pupil;
    generating a succeeding image of the true boundaries of the pupil;
    determining boundaries of the iris and generating an image containing the true boundaries of the iris; and
    generating a final image of the iris from the image containing the true boundaries of the iris.

2. The method of claim 1, further comprising conducting an identification or authentication process based on optical analysis of the final image of the iris and comparison with a pre-established data corresponding to a person whose identity has been confirmed.

3. The method of claim 1, wherein the step of capturing a gray scale image of the iris and reflections of the point light sources comprises capturing reflections of the point light sources of an area between two percent and seventy-five percent of the surface area of the iris.

4. The method of claim 1, wherein the step of capturing a gray scale image of the iris and reflections of the point light sources comprises capturing reflections of the point light sources of an area between two percent and ten percent of the surface area of the iris.

5. The method of claim 1, wherein the step of capturing a gray scale image of the iris and reflections of the point light sources comprises acquiring eye images in red-green-blue color mode and converting the eye images to an eight bit gray scale using a the formula wherein intensity=0.21 red+ 0.72 blue+0.07 blue.

6. The method of claim 1, wherein the step of deriving a two tone image from the gray scale image further comprises performing at least two iterations of deriving a two tone image from the gray scale image, and, within a range of 0 to 255, where pixels exceeding specified the threshold value are rendered as white, with remaining pixels are rendered as black, using a gray scale level threshold of 200 as suitable for the first iteration, and using a gray scale level threshold of 215 as suitable for a second iteration.

7. The method of claim 6, further comprising:
    comparing paired reflections to one another for size, for each gray scale threshold being used; and
    discarding any reflection that changes in width or height by fifty percent or more.

8. The method of claim 1, further comprising screening out false results arising from spurious reflections, by calculating height and width of each reflection candidate, and determining an effective center of each reflection candidate.

9. The method of claim 1, wherein determining boundaries of the iris and generating an image containing the true boundaries of the iris further comprises:
    designating an arbitrary rectangular zone around the pupil;
    establishing a diagonal spanning opposed corners of the arbitrary rectangular zone;

setting a length of the diagonal at not less than N times the size of the pupil diameter, where N equals the number of reflection light sources plus two, divided by the number of reflection light sources;

calculating a value D of pupil diameter as horizontal resolution, stated as pixels per inch, plus vertical resolution, stated as pixels per inch, then dividing the sum by four; and establishing that D is greater than N multiplied by pupil size.

10. The method of claim 9, further comprising minimizing a finalized area of the image containing the true boundaries of the iris by:

utilizing a number of images and manually calculating the number of dots in the diameter of pupil 212; and taking an average, to arrive at an estimate of pixels occurring in a diameter of the pupil.

11. The method of claim 10, further comprising:

using coordinates of a rectangular zone around the pupil to extract an image portion;

subjecting the image to inversion of white and black portions by subtracting the original intensity value from 255;

approximating how close the pupil contour is to a circle; and applying black-to-white truncation using different threshold values, using an arbitrary range of truncation threshold within a range of 232 to 244.

12. The method of claim 11, wherein approximating how close the pupil contour is to a circle further comprises:

finding a true contour of the pupil by combining limited zones having captured reflections to form a master image;

finding true boundaries of the pupil, based on an approximation of how close the pupil contour is to a circle;

remapping the master image to scale dot matrix polar space coordinates, in plural iterations; and remapping the original image to scale dot-matrix log-polar space coordinates.

13. The method of claim 12, further comprising:

detecting boundaries in a remapped original image by filtering out all short lines and all lines deviating from the vertical by more than sixty degrees, where short lines are those less than ten percent of the average size from the sum of the lengths of all lines divided by the number of lines representing a gradient border; and connecting all remaining lines into a single line.

14. The method of claim 13, further comprising deciding whether to connect any two lines by initially connecting the two lines, converting the image back into Cartesian coordinates, and assessing how well the connected line approximates an ellipse.

15. The method of claim 14, further comprising:

determining a boundary line of the iris, arbitrarily establishing a rectangular portion of the image six times as large as the pupil diameter around the pupil center;

remapping the original image to scale dot-matrix log-polar coordinates;

encircling the iris by filtering; and filtering out short lines and lines deviating from the vertical, thereby generating a contour that approximates the boundary of the iris, and enabling conventional image analysis to be conducted.

16. The method of claim 15, further comprising detecting a person's identity based on comparing unchangeable natural biometric characteristics.

17. The method of claim 15, further comprising confirming identity of a biometric associated with a non-biometric.

18. The method of claim 15, further comprising terminating identification if a condition preventing successful identification or authentication is found.

19. The method of claim 15, further comprising self-scanning for real time interactive scanning navigation control for access authorization to a physical location and to restricted data.

20. The method of claim 15, further comprising monitoring eye related physiological behavior and detecting at least one of spurious attempts to circumvent security procedures and physiological impairment.

* * * * *